United States Patent
Gin (10) Patent No.: US 11,948,452 B2
(45) Date of Patent: Apr. 2, 2024

(54) SYSTEM AND METHOD OF PROCESSING TRAFFIC INFORMATION USING BLOCKCHAIN TECHNOLOGY

(71) Applicants: HYUNDAI MOTOR COMPANY, Seoul (KR); KIA MOTORS CORPORATION, Seoul (KR)

(72) Inventor: Jae Hwa Gin, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 550 days.

(21) Appl. No.: 16/516,648

(22) Filed: Jul. 19, 2019

(65) Prior Publication Data
US 2020/0143668 A1 May 7, 2020

(30) Foreign Application Priority Data
Nov. 1, 2018 (KR) .......................... 10-2018-0132802

(51) Int. Cl.
| | |
|---|---|
| G08G 1/01 | (2006.01) |
| G08G 1/09 | (2006.01) |
| H04L 9/06 | (2006.01) |
| H04W 4/40 | (2018.01) |
| H04L 9/00 | (2022.01) |

(52) U.S. Cl.
CPC .......... *G08G 1/0125* (2013.01); *G08G 1/0112* (2013.01); *G08G 1/091* (2013.01); *H04L 9/0643* (2013.01); *H04W 4/40* (2018.02); *H04L 9/50* (2022.05); *H04L 2209/84* (2013.01)

(58) Field of Classification Search
CPC .... G08G 1/0125; G08G 1/0112; G08G 1/091; H04W 4/40; H04L 9/0643; H04L 2209/38; H04L 2209/84
See application file for complete search history.

(56) References Cited

U.S. PATENT DOCUMENTS

| | | | |
|---|---|---|---|
| 8,907,773 B2 | 12/2014 | Choi | |
| 10,708,069 B2 | 7/2020 | Chun | |
| 2012/0242473 A1* | 9/2012 | Choi | .................. G01C 21/3688 340/441 |

(Continued)

FOREIGN PATENT DOCUMENTS

| | | |
|---|---|---|
| KR | 101525842 B1 | 6/2015 |
| KR | 101678795 B1 | 11/2016 |

OTHER PUBLICATIONS

Office Action cited in corresponding Korean patent application No. 10-2018-0132802; dated Oct. 31, 2023; 10pp.

*Primary Examiner* — Peter D Nolan
*Assistant Examiner* — Roy Rhee
(74) *Attorney, Agent, or Firm* — Lempia Summerfield Katz LLC (57) ABSTRACT

A system and method of processing traffic information using blockchain technology is disclosed. The method includes collecting traffic information by a first vehicle, updating a first block using the collected traffic information by the first vehicle, sharing a verification target block corresponding to the updated first block in a network by the first vehicle, verifying the shared verification target block by at least one second vehicle present in the network, and sharing a second block including the updated traffic information in the network when the verifying is successful by the at least one second vehicle.

7 Claims, 7 Drawing Sheets

(56) References Cited

U.S. PATENT DOCUMENTS

| | | | |
|---|---|---|---|
| 2016/0189544 A1* | 6/2016 | Ricci | G08G 1/0116 |
| | | | 701/117 |
| 2018/0254905 A1 | 9/2018 | Chun | |
| 2018/0276055 A1* | 9/2018 | Furuichi | G06F 9/542 |
| 2019/0182030 A1* | 6/2019 | Jo | H04L 9/0637 |
| 2020/0280553 A1* | 9/2020 | Simons | H04L 63/12 |
| 2021/0111900 A1* | 4/2021 | Inokuchi | H04L 9/3239 |
| 2021/0264526 A1* | 8/2021 | Bryant | G06F 16/27 |

* cited by examiner

SYSTEM AND METHOD OF PROCESSING TRAFFIC INFORMATION USING BLOCKCHAIN TECHNOLOGY

This application claims the benefit of Korean Patent Application No. 10-2018-0132802, filed on Nov. 1, 2018, which is hereby incorporated by reference as if fully set forth herein.

BACKGROUND

Field

The present disclosure relates to a system and method of processing traffic information using blockchain technology.

Discussion of the Related Art

Among recently introduced vehicles, a considerable number of vehicles include a global positioning system (GPS) receiver installed therein for acquiring position information and the vehicles periodically report positions thereof to a server through a wireless communication device such as a telematics MODEM. The server generates real time traffic information based on position information received from a plurality of vehicles and re-transmits the traffic information to the vehicles to enable the vehicles to use the traffic information.

SUMMARY

The present disclosure is directed to a system and method of processing traffic information using blockchain technology that substantially obviates one or more problems due to limitations and disadvantages of the related art.

Aspects of the present disclosure provide a system and method of processing traffic information for enhancing the accuracy and security of information when traffic information is collected, generated, and shared.

Additional advantages and features of the present disclosure will be set forth in part in the description which follows and in part will become apparent to those having ordinary skill in the art upon examination of the following or may be learned from practice of the present disclosure. The advantages of the present disclosure may be realized and attained by the structure particularly pointed out in the written description according to one or more embodiments of the present disclosure and the claims hereof as well as the appended drawings.

In accordance with an aspect of the present disclosure, as embodied and broadly described herein, there is provided a method of processing traffic information includes collecting traffic information by a first vehicle, updating a first block using the collected traffic information by the first vehicle, sharing a verification target block corresponding to the updated first block in a network by the first vehicle, verifying the shared verification target block by at least one second vehicle present in the network, and sharing a second block including the updated traffic information in the network when the verifying is successful by the at least one second vehicle.

In another aspect of the present disclosure, a vehicle incudes a traffic information collection unit configured to acquire traffic information, a blockchain processor configured to update a first block using the collected traffic information, and a communication unit configured to share a first verification target block in a network to verify a verification target block corresponding to the updated first block by at least one vehicle present in the network and to share a second block including the updated traffic information in the network.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DETAILED DESCRIPTION

Exemplary embodiments of the present disclosure are described in detail so as for those of ordinary skill in the art to easily implement with reference to the accompanying drawings. However, the embodiments of the present disclosure may be implemented in various different forms and is not limited to these embodiments. To clearly describe the embodiments of the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Figure 1:
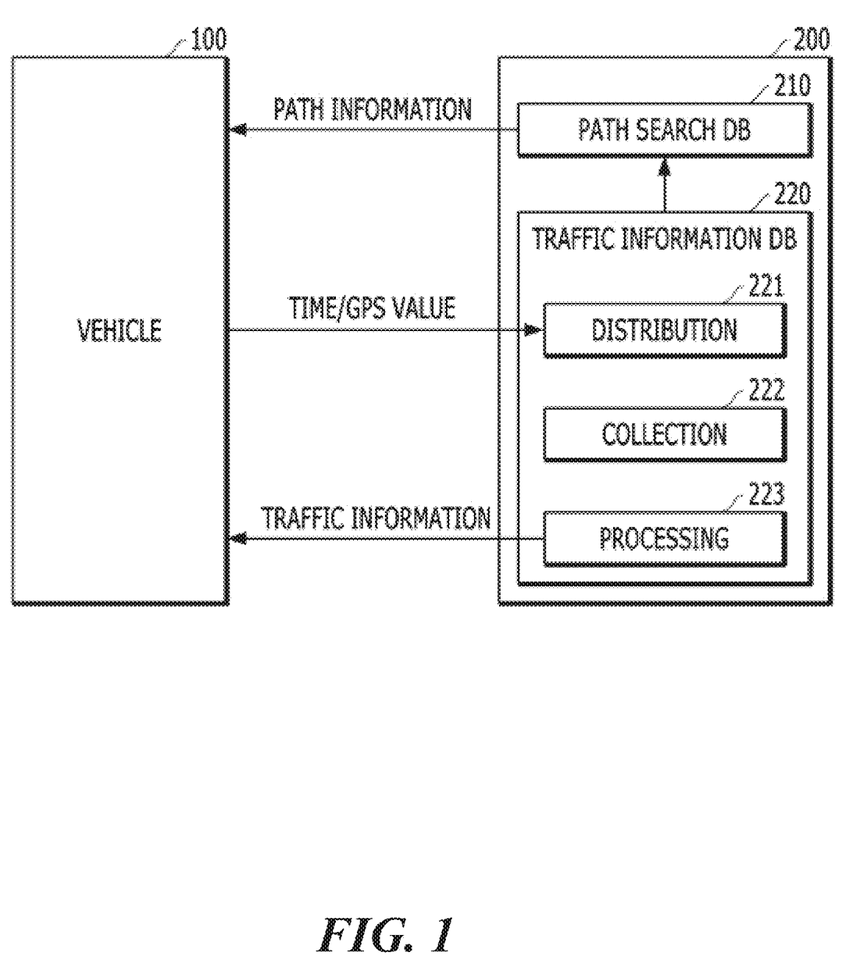
FIG. 1 is a diagram for explanation of a method of collecting and providing general traffic information.

FIG. 1 is a diagram for explanation of a method of collecting and providing general traffic information.

Referring to FIG. 1, a plurality of vehicles 100 and a server 200 participate in collection and provision of the traffic information. The server 200 may include a path search database 210 and a traffic information database 220.

Each of the vehicles 100 acquires its position information periodically at every first time period and transmits the acquired information to the server 200 periodically at every second time period. For example, the first time period may be 1 second and the second time period may be 1 minute. In this case, a vehicle transmits 60 pieces of time and position information, which are collected every second for 1 minute, to the server 200 every minute. For example, the form of the transmitted information may be a time/GPS value.

The server 200 performs distribution 221, collection 222, and processing 223 on information collected from each vehicle to generate real-time traffic information. For example, in the processing operation 223, the time/GPS value may be converted into link/speed. The real-time traffic information generated using the method may be referred to by the path search database 210, may be used to provide path information to a vehicle, and may be transmitted to the vehicles 100 in the form of traffic information.

Here, the link is a basic unit for identifying traffic information, which will be described with reference to FIG. 2.

Figure 2:
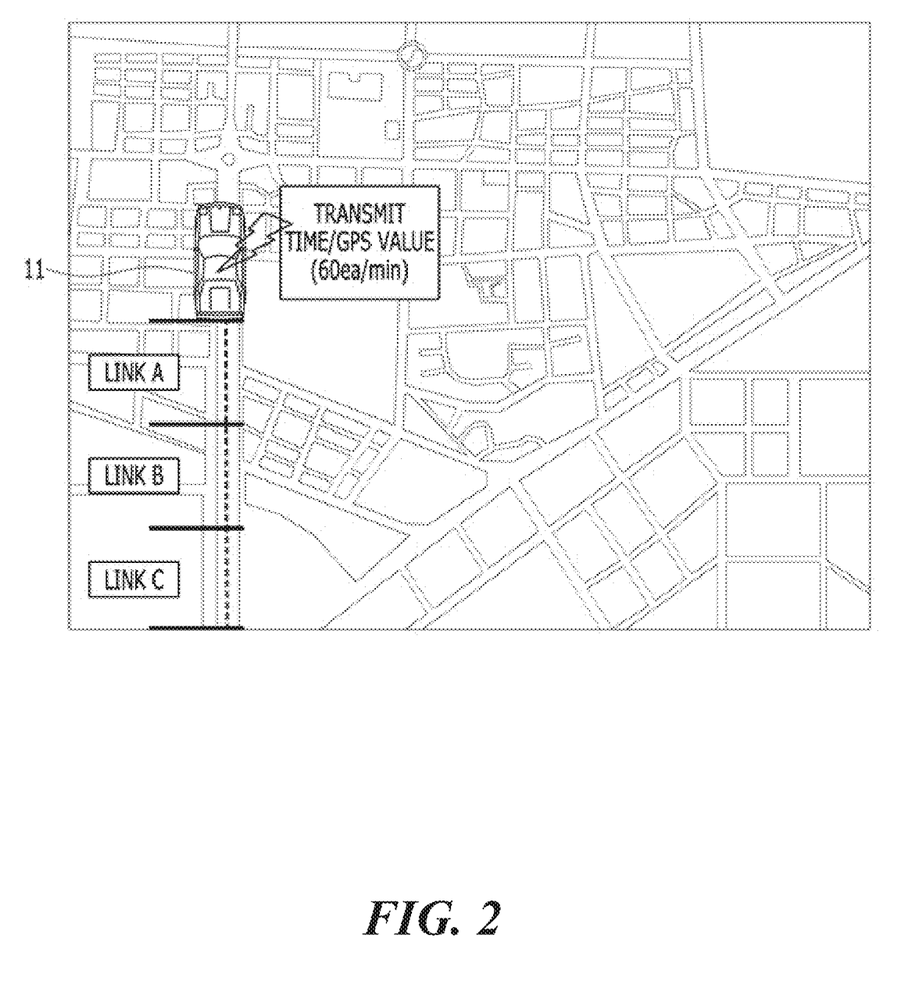
FIG. 2 is a diagram for explanation of a concept of a general link.

FIG. 2 is a diagram for explanation of a concept of a general link.

Referring to FIG. 2, while driving on a road, a vehicle 11 generates position information on a 1-second basis and displays a place at which the position information is generated, in the form of a point. In this case, the road on which the vehicle drives is divided into three links Link A, Link B, and Link C and, in this case, a link with a large number of points means that a long time is taken to cross a corresponding range and a link with a small number of points means that a short time is taken to cross a corresponding range. Accordingly, as seen from FIG. 2, about 5.5 points may be present in each link and, thus, the vehicle 11 may drive on each link at a fixed speed. Each link may be set on a distance basis or may be determined according to various references such as an intersection or whether a surrounding geographical feature is present.

However, when the server 200 provides traffic information to the vehicles 100, distribution 221, collection 222, and processing 223 are performed and, thus, there may be some time delay, and due to a reporting period (e.g., one minute) of the vehicles 100, real-time updating may be difficult in some cases. The vehicles 100 that transmit the traffic information to the server 200 are assigned terminal numbers, respectively and, thus, position information of the vehicles may not be protected. In addition, there is the possibility that someone can fabricate the traffic information by hacking the server 200, and when the number of the vehicles 100 that provide information is increased, there is the risk of overloading the server 200.

According to proposal of embodiments of the present disclosure, information collected by individual vehicles in a network may be verified and shared based on blockchain technology.

Blockchain is technology for preventing data forgery and alteration based on distributed computing technology, whereby management target data in the form of small scale data called 'block' is stored in a distributed data storage environment based on a connecting link formed in a chain generated using a P2P method, nobody is capable of arbitrarily correcting the data, and anyone is capable of accessing the change result.

Any information history that has been previously propagated to users before the corresponding block is discovered is recorded in the block, and the information history is transmitted to all users in the same manner using a P2P method and, thus, the information history is not capable of being arbitrarily corrected or omitted. The block has the date of discovering the block and a connection link to a previous block, and a combination of such blocks is referred to as blockchain. Unlike in the conventional case in which information record is maintained in a central server, according to blockchain, changed record may be exposed to all users, and data may be compared to prevent forgery.

Figure 3:
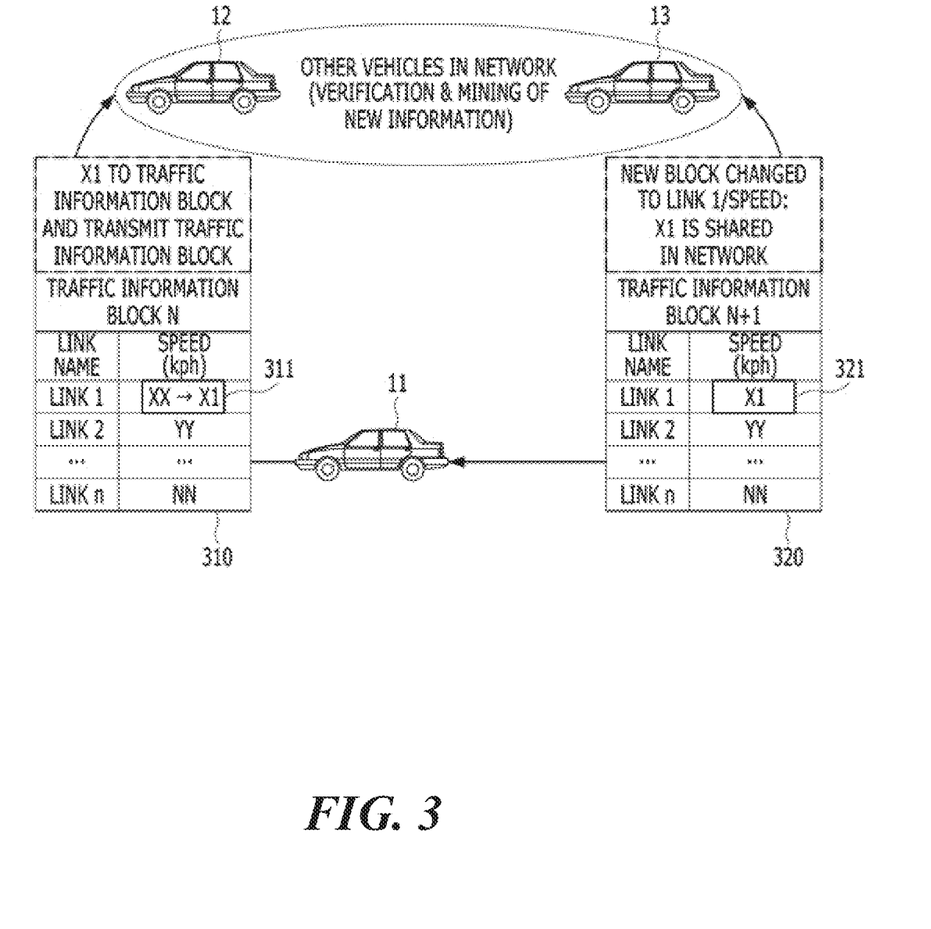
FIG. 3 is a diagram for explanation of a concept of a method of sharing traffic information based on blockchain according to an embodiment of the present disclosure.

FIG. 3 is a diagram for explanation of a concept of a method of sharing traffic information based on blockchain according to an embodiment of the present disclosure.

In FIG. 3, three vehicles 11, 12, and 13 including a subject vehicle 11 are assumed to be present in a network, but the number of vehicles in the network is for convenience of description but is not limited thereto. When each of the vehicles 11, 12, and 13 is present in a network, this means that each of the vehicles 11, 12, and 13 is in a state in which vehicles are capable of exchanging with each other according to a predetermined wireless communication protocol. The wireless communication protocol may be any communication protocol without being limited thereto as long as the protocol enables V2V communication.

Referring to FIG. 3, first, the subject vehicle 11 may process traffic information collected thereby in the form of link/speed and may correct speed information 311 of a link (here, Link 1) corresponding to traffic information that is collected by the subject vehicle from in an existing traffic information block n 310. Then, the subject vehicle 11 may share the corresponding block in a network.

Accordingly, the other vehicles 12 and 13 in the network may verify and mine the block with corrected information. When verification is successfully completed, a new block n+1 320 in which a speed of Link 1 is corrected to X1 321 from XX may be shared in the whole network.

Blockchain that is customized based on the $3^{rd}$ generation blockchain open source may be used in the aforementioned method of sharing traffic information based on blockchain, and basic blockchain technology itself, such as a P2P network method, a data structure, and cryptography, employs a method applied to cryptocurrency such as Ethereum, but the present disclosure is not limited thereto. In addition, a consensus algorithm may be selected from structures in which any of proof of work (POW), proof of stake (POS), delegated POS (dPOS), and private byzantine fault tolerance (PBFT) methods is capable of being used, but the present disclosure is not limited to the corresponding methods.

Figure 4:
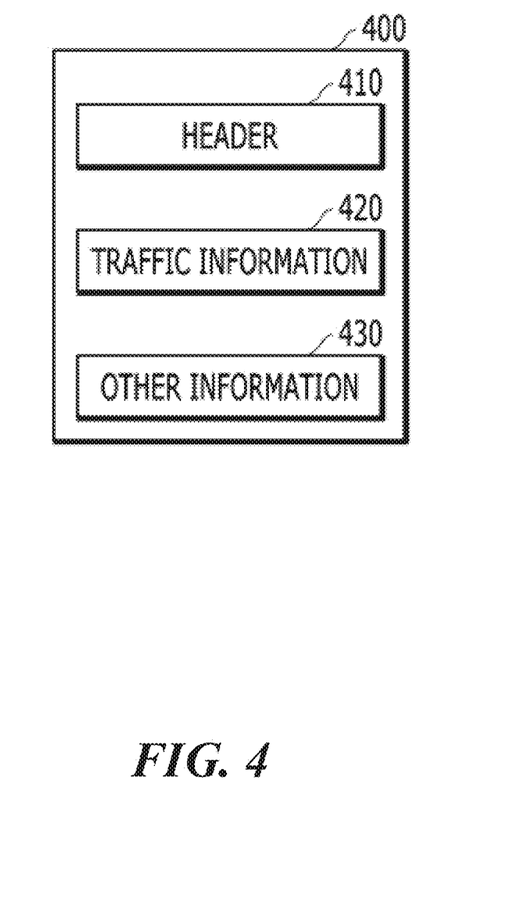
FIG. 4 is a diagram showing an example of a block structure for sharing traffic information based on blockchain according to an embodiment of the present disclosure.

Hereinafter, the structure of a block used to share traffic information will be described with reference to FIG. 4. FIG. 4 is a diagram showing an example of a block structure for sharing traffic information based on blockchain according to an embodiment of the present disclosure.

Referring to FIG. 4, a block 400 according to an embodiment may include a header 410 and bodies 420 and 430. In detail, the body may include traffic information 420 and other information 430.

The header 410 may include basic information of a block, such as a block generator, a difficulty level, or count, the traffic information 420 may include at least one piece of speed information for each link, and the other information 430 may include the remaining information that does not correspond to the header 410 and the traffic information 420 among information items in the block 400 and may not be used to calculate a block hash.

In more detail, the header 410 may include at least one of version information indicating a software/protocol version, previousblockhash information, merklehash, block generation time, difficulty level adjustment information, or nonce information.

The previousblockhash information may indicate a block hash of a block positioned immediately before a blockchain, and the merklehash may be a hash value positioned at a tree root when a transaction hash of individual transaction information is configured in the form of a binary tree. The nonce information may indicate nonce whereby a hash value is increased one by one until a hash value satisfying a condition is found from an initial value 0.

With regard to the information of the header 410, a block hash that functions as an identifier of the block 400 may be used as an input value of the information of the header 410.

In the end, individual traffic information may be integrated into a merklehash value that is a hash value of a merkle tree. The remaining information except for the nonce information of information included in the header 410 may be a value that is already fixed at a time point of forming a block hash and is not changed and the nonce information may be a value that needs to be newly obtained rather than being fixed. Accordingly, a procedure of obtaining the nonce information to lastly acquire a block hash value and forming a valid block having the obtained block hash value as an identifier may be Proof of Work, that is, a so-called mining procedure.

Figure 5:
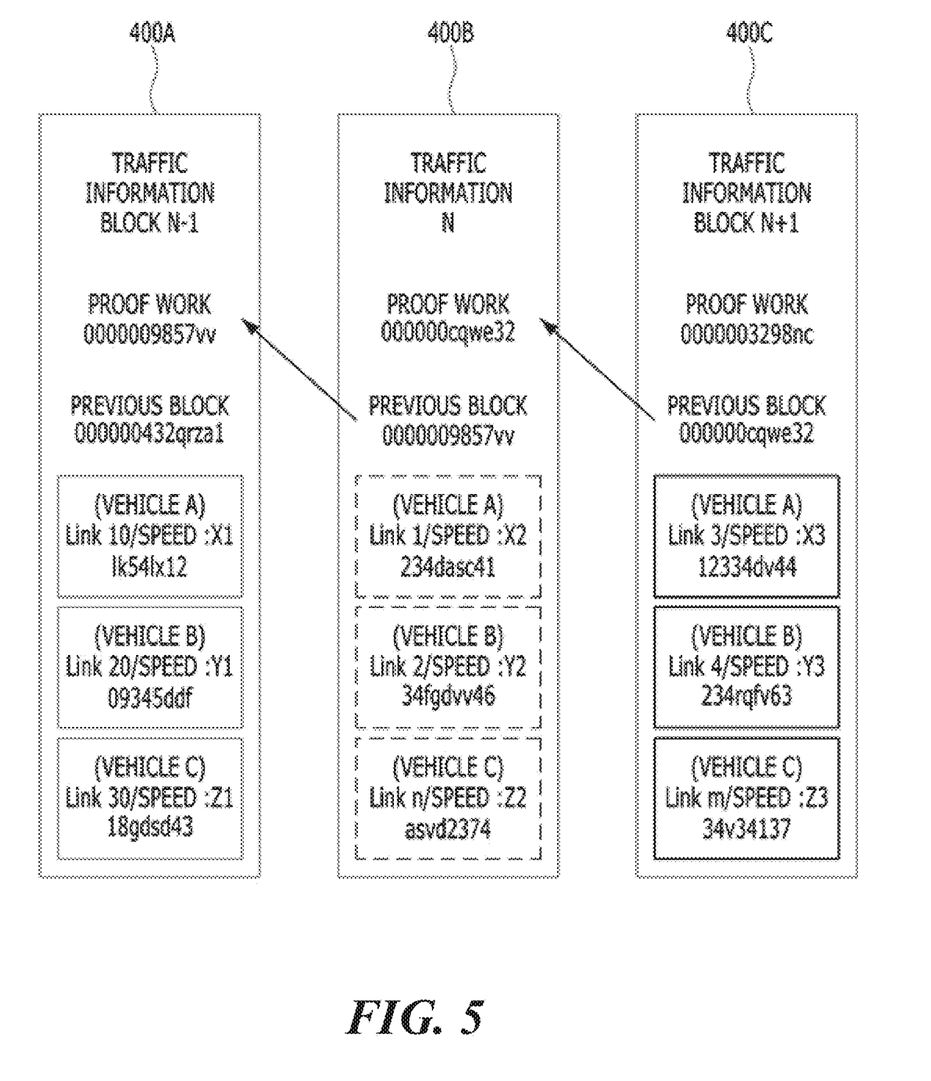
FIG. 5 is a diagram showing an example in which traffic information is verified and information is added in a block order according to an embodiment of the present disclosure.

Hereinafter, a procedure of verifying and adding information will be described with reference to FIG. 5. FIG. 5 is a diagram showing an example in which traffic information is verified and information is added in a block order according to an embodiment of the present disclosure.

In FIG. 5, three blocks 400A, 400B, and 400C including traffic information, that is, traffic information blocks are illustrated in a generation order (n−1, n, and n+1). For convenience of description, the same division as in FIG. 4 is omitted.

Referring to FIG. 5, each block may include proof work information, previous block information, and traffic information generated by an individual vehicle. Here, the proof work information and the previous block information may correspond to previousblockhash and merklehash, respectively, which are described above with reference to FIG. 4. For example, an $n^{th}$ traffic information block 400B may own, as the previous block information, proof work information of an (n−1)th traffic information block 400A that is a previous block, and an (n+1)th traffic information block 400C may own, as the previous block information, proof work information of the $n^{th}$ traffic information block 400B that is a previous block. As such, since the blockchain-based traffic information block is associated with a previous block, it is not possible to alter only a specific block and, thus, high security is achieved.

Based on the above description, a procedure of generating and sharing traffic information will be described with reference to FIG. 6.

Figure 6:
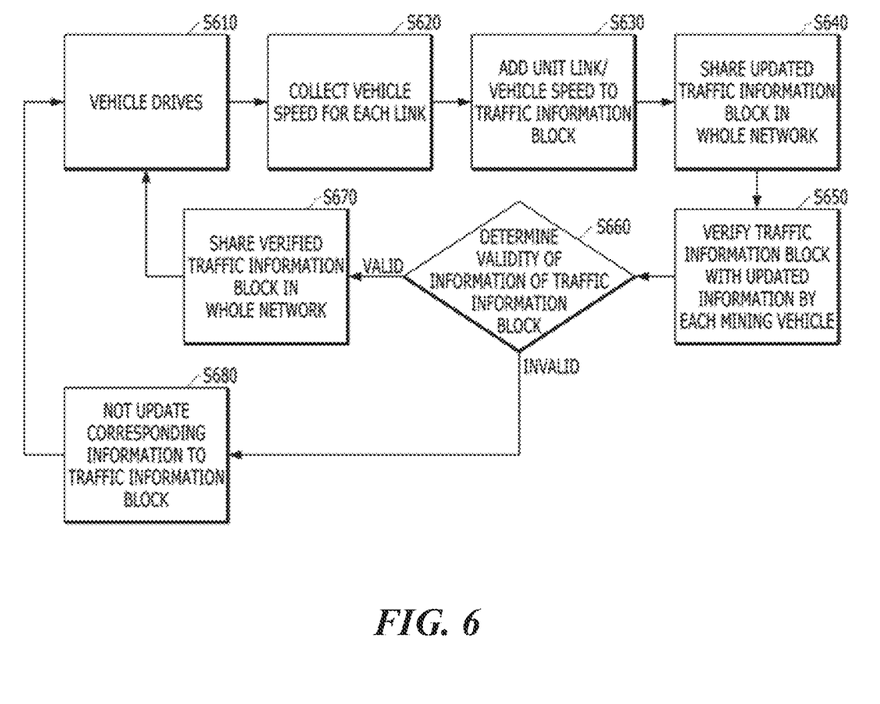
FIG. 6 is a flowchart showing an example of a procedure of generating and sharing traffic information according to an embodiment of the present disclosure.

FIG. 6 is a flowchart showing an example of a procedure of generating and sharing traffic information according to an embodiment of the present disclosure.

Referring to FIG. 6, while a vehicle drives (S610), the vehicle may collect a speed for each link (S620). Collection of a speed for each link may be a procedure of mapping position information recorded in units of predetermined times to a map and converting the position information into a speed for each link.

The vehicle that collects traffic information may add speed information corresponding to a link, which is collected in a traffic information block by the vehicle, to a currently owned (i.e., $n^{th}$) traffic information block (S630) and may share the traffic information block (i.e., a verification target block) with updated information in a whole network (S640). Accordingly, other vehicles (e.g., a mining vehicle) present in the corresponding network may verify the shared verification target block (S650).

As the verification result, when information of the corresponding verification target block is determined to be valid (VALID of S660), the verified traffic information block may become a $(n+1)^{th}$ block and may be shared in the whole network (S670). On the other hand, when the information is not determined to be valid, updated information of the verification target block may not be included in the $(n+1)^{th}$ block (S680).

Hereinafter, a vehicle for performing the aforementioned method of processing traffic information will be described with reference to FIG. 7.

Figure 7:
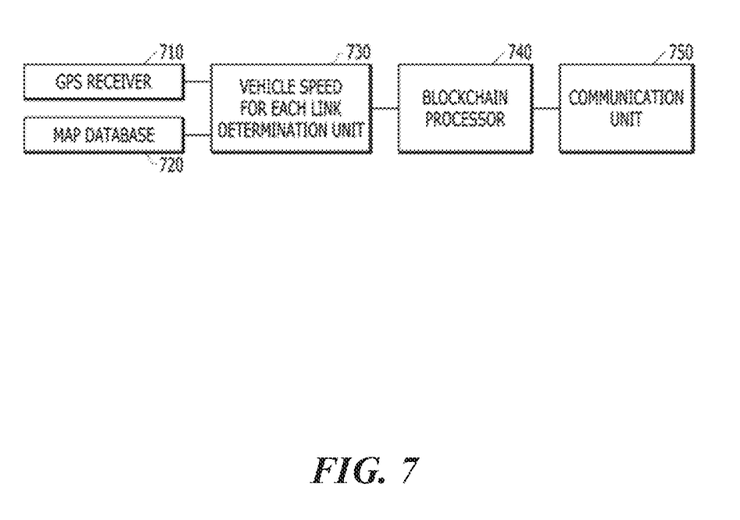
FIG. 7 is a block diagram showing an example of the configuration of a vehicle for processing traffic information according to an embodiment of the present disclosure.

FIG. 7 is a block diagram showing an example of the configuration of a vehicle for processing traffic information according to an embodiment of the present disclosure.

Referring to FIG. 7, the vehicle according to the embodiment may include a global positioning system (GPS) receiver 710, a map database 720, a vehicle speed for each link determination unit 730, a blockchain processor 740, and a communication unit 750.

The GPS receiver 710 may acquire position information with a predetermined period (e.g., 1 second) and the map database may include map information having at least link section information. The vehicle speed for each link determination unit 730 may map the position information acquired by the GPS receiver 710 to link information of the map database 720 and may determine a speed for each link. Accordingly, the GPS receiver 710, the map database 720, and the vehicle speed for each link determination unit 730 may be collectively referred to as a traffic information collection unit.

The blockchain processor 740 may add the speed for each link acquired by the vehicle speed for each link determination unit 730 to a traffic information block to share the traffic information block in the whole network through the communication unit 750 and may process verification on the verification target block received through the communication unit 750. The blockchain processor 740 may share a target block that is successfully verified in the whole network through the communication unit 750.

The communication unit 750 may perform at least one of an operation of sharing a traffic information block to which traffic information is added by at least a vehicle, an operation of acquiring a verification target block transmitted by another vehicle, or an operation of sharing a verified traffic information block verified by a subject vehicle on other vehicles in a network through a preset wireless communication protocol.

The aforementioned embodiments may have the following advantages compared with processing of general traffic information.

First, with regard to general traffic information, although the traffic information is updated in real time, there is a limit in that the information is updated on a 1 minute basis. However, when the blockchain method according to the embodiments is used, traffic information is collected and, then, validity of the traffic information is advantageously and immediately verified and the traffic information may be shared in a network, thereby enhancing the accuracy of the traffic information.

In a method of processing general traffic information, vehicles that transmit traffic information are assigned terminal numbers, respectively and, thus, position information of the vehicles is not protected. On the other hand, when the blockchain method according to the embodiments is used, a subject that transmits traffic information on a current link may be encrypted and, thus, it may not be possible to track the subject.

In addition, general traffic information has the risk of hacking traffic information when a server is hacked by collecting and analyzing the information but, when the blockchain method according to the embodiments is used, new update information is simultaneously verified by all vehicles and, thus, hacking is not possible.

Through the above configured system for processing traffic information related to at least one embodiment of the present disclosure, validity of the traffic information may be immediately verified and the traffic information may be shared in a network, thereby enhancing the accuracy of the traffic information.

In addition, a subject that transmits information on a link is not exposed and, thus, security of a vehicle that collects information may be enhanced and there is no worry about server hacking.

It will be appreciated by persons skilled in the art that the effects that could be achieved with the present disclosure are not limited to what has been particularly described hereinabove and other advantages of the present disclosure will be more clearly understood from the detailed description.

The aforementioned embodiments of the present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosure. Thus, it is intended that the present disclosure cover the modifications and variations provided they come within the scope of the appended claims and their equivalents.

What is claimed is:

1. A method of processing traffic information using blockchain technology, the method comprising:
    collecting, by a first vehicle, traffic information;
    updating, by the first vehicle, traffic information of a first block based on the collected traffic information, the first block comprising a header and at least one body including the traffic information;
    sharing, by the first vehicle, a verification target block with at least one second vehicle present in a network in a manner using a peer-to-peer (P2P) method, wherein the verification target block is an updated first block including the updated traffic information;
    verifying, by the at least one second vehicle present in the network, the shared verification target block;
    sharing, by the at least one second vehicle, a second block including the updated traffic information of the verified verification target block with other vehicles present in the network in response to a determination that the verifying is successful; and
    sharing, by the at least one second vehicle, the second block not including the updated traffic information of the verified verification target block with the other vehicles present in the network in response to a determination that the verifying is not successful,
    wherein collecting the traffic information includes
        collecting, by the first vehicle, position information with a predetermined period, and
        converting, by the first vehicle, the position information collected with the predetermined period into a speed for each of at least one link with reference to a map database including map information having at least link section information.

2. The method of claim 1, wherein:
    the first block includes speed information for each of the at least one link; and
    the updating includes updating speed information on a link corresponding to the collected traffic information in the first block.

3. The method of claim 1, wherein the second block has a proof of work hash value of the first block.

4. A non-transitory computer readable recording medium having recorded thereon a program for executing the method of claim 1.

5. A first vehicle comprising:
    a traffic information collection unit configured to collect traffic information;
    a blockchain processor configured to update traffic information of a first block, the first block comprising a header and at least one body including the traffic information, wherein a verification target block is an updated first block including the updated traffic information; and
    a communication unit configured to share the verification target block with at least one second vehicle present in a network in a manner using a peer-to-peer (P2P) method and to receive another verification target block from the at least one second vehicle present in the network in a manner using the P2P method,
    wherein a traffic information of a first block in the at least one second vehicle is updated, and the another verification target block is an updated first block including the updated traffic information in the at least one second vehicle,
    wherein the communication unit verifies the another verification target block received from the at least one second vehicle present in the network,
    wherein the first vehicle shares a second block including the updated traffic information of the verified another verification target block in response to a determination that the verifying is successful,
    wherein the first vehicle shares the second block not including the updated traffic information of the verified another verification target block in response to a determination that the verifying is not successful, and
    wherein the traffic information collection unit includes
        a global positioning system (GPS) receiver configured to collect position information with a predetermined period, and
        a vehicle speed for each link determination unit configured to convert the position information collected with the period into a speed for each of at least one link with reference to a map database including map information having at least link section information.

6. The first vehicle of claim 5, wherein:
    the first block includes speed information for each of the at least one link; and
    the blockchain processor updates speed information on a link corresponding to the collected traffic information in the first block.

7. The first vehicle of claim 5, wherein the second block has a proof of work hash value of the first block.

* * * * *